Aug. 13, 1946.  W. P. SHAKS  2,405,760
FISH SCALING CLAMP
Filed July 18, 1944
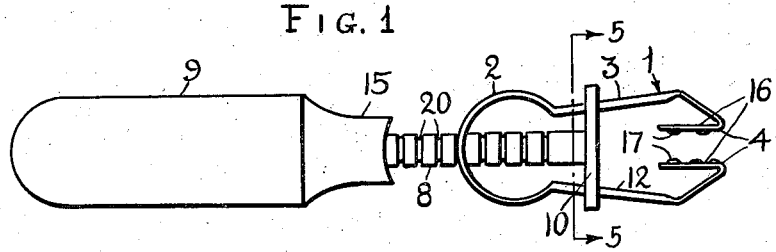
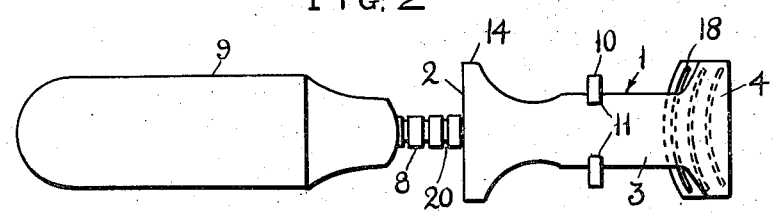
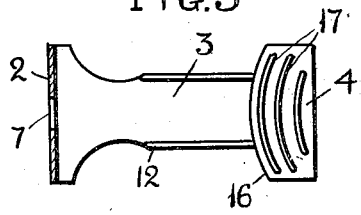 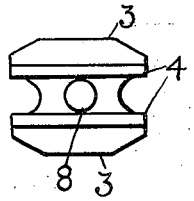 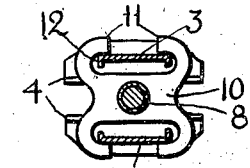
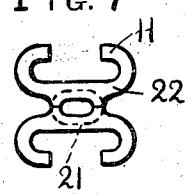
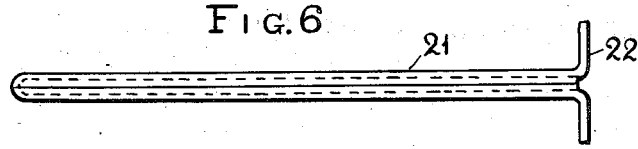
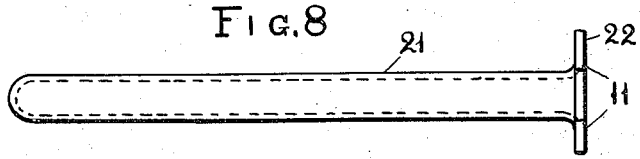
WILLIAM P. SHAKS
INVENTOR
BY John P. Mironow
ATTORNEY Patented Aug. 13, 1946

2,405,760

UNITED STATES PATENT OFFICE 2,405,760

FISH-SCALING CLAMP

William P. Shaks, Woodside, N. Y.

Application July 18, 1944, Serial No. 545,503

2 Claims. (Cl. 81—43)

My invention relates to fish scaling clamps and has particular reference to portable clamps for holding a fish while the latter is being scaled or cleaned.

My invention has for its object to provide a simple, light, convenient and effective clamp which can be used for securely engaging the tail of a fish, the clamp having a convenient handle so that it can be held, for instance, in the left hand while the fish is scaled by a suitable tool held in the right hand.

Another object of my invention is to provide a fish scaling clamp which can be conveniently held in the palm of the hand while the tightening and loosening of the clamp can be effected by the fingers of the same hand. The preferred arrangement is such that the handle can be firmly held using four fingers, the thumb being used for moving a locking slider along the clamp for tightening or loosening the jaws.

Another object of my invention is to provide a fish scaling clamp which can be cheaply and conveniently made of a resilient sheet material as by stamping and forming, the clamping jaws being formed by suitably bending the end portions of the clamp.

Ordinary clamps, some of which are also used for scaling fish, have certain disadvantages not only as regards convenience in handling fish but also because they are usually provided with sharp teeth or hooks, and I have found that such teeth or hooks tend to damage the fish. In my clamp therefore, I provide jaws with substantially parallel cooperating sides which may be provided with transverse ridges for engaging the fish, the ridges being of such a nature as not to cut into the body of the fish.

My invention is more fully described in the accompanying specification and drawing in which:

Fig. 1 is a side view of my fish scaling clamp;

Fig. 2 is a top view of the same;

Fig. 3 is a sectional detail view of one clamping jaw;

Fig. 4 is an end view of the same;

Fig. 5 is a sectional view taken on the line 5—5 of Fig. 1;

Fig. 6 is a side view of a modified central rod for the handle of the clamp;

Fig. 7 is an end view of the same;

Fig. 8 is a top view of the same.

My fish scaling clamp as shown in Figs. 1 to 5 inclusive comprises a U-shaped clamping member generally designated by the numeral 1 and preferably made of a resilient sheet metal. The clamp member has a rounded bight portion 2, legs 3 and jaw portions 4 at the ends. The bight 2 has an opening in the center for a rod 8, one end of which is fastened in a handle 9. The other end of the rod is attached to a slider plate 10 having hooks 11 slidably engaging the straight sides 3. The sides have parallel edges 12 and extend at a small angle to the axis of the clamp, diverging outwards toward the jaws, so that the slider 10 will draw the jaws together when the clamping member 1 is moved toward the handle.

The bight 2 is made relatively wide, partly to increase the resilient resistance to bending and partly to provide edges 14, Fig. 2, extending substantially above the tapered front end 15 of the handle so that the clamping member can be moved by the thumb of the operator's hand when he holds the handle in the palm of his hand.

The jaws are made by bending the metal inwards thereby obtaining parallel cooperating portions 16 on the jaws 4. Ridges 17 may be formed on the surfaces of the portions 16 for a better grip on the tail of a fish, the ridges being preferably formed by making depression 18 at the back sides of the portion 16 of the jaws as shown in Fig. 2.

The angle between the sides 3 of the clamping member can be made sufficiently small so that the clamp will retain its locked position when the jaws engage the tail of a fish. The locking can be made more positive by providing notches or grooves 20 on the rod 8, the notches being adapted to engage the edge of the bight 2 at the hole in the bight, for which purpose the clamping member is slightly moved off center for causing the edge in the hole at one side to enter the groove.

The central rod can be made integrally with the slider as shown in Figs. 6, 7 and 8, by stamping out the main portion 21 of sheet metal and joining the edges as by welding or soldering. The slider portion 22 with the hooks 11 is formed by bending outwards the enlarged ends of the metal blanks from which the portion 21 is formed.

My clamping device has an important advantage in that it can be easily manipulated by one hand, also that it will hold firmly the tail of a fish without injuring the same, and it can be cheaply made by stamping out of sheet metal.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A fish scaling clamp comprising a U-shaped member made of a resilient sheet material and having a relatively wide bight, the ends of the legs of the U-shaped member being bent inwards to form substantially parallel clamping portions, the sides of the legs diverging outwards; a slider between the legs having hook-shaped corner portions engaging the edges of the legs; a rod-like member extending from the slider and passing through a hole in the bight; and a handle at the outer end of the rod-like member, the rod-like member having annular indentations for engaging the edges of the hole in the bight of the U-shaped member, thereby locking the legs of said U-shaped member in a desired position.

2. A fish scaling clamp comprising a U-shaped member made of a resilient sheet material and having a relatively wide bight, the ends of the legs of the U-shaped member being bent inwards to form substantially parallel clamping portions, the sides of the legs diverging outwards; a slider between the legs having hook-shaped corner portions engaging the edges of the legs; a rod-like member extending from the slider and passing through a hole in the bight; and a handle at the outer end of the rod-like member, the rod-like member having a plurality of indentations for engaging the edges of the hole in the bight of the U-shaped member thereby locking the legs of said U-shaped member.

WILLIAM P. SHAKS.